Feb. 27, 1962　　F. K. BOWERS ETAL　　3,023,384
BROAD-BAND FERRITE POLARIZATION ROTATOR
Filed Sept. 22, 1955　　　　　　　　　　　　　2 Sheets-Sheet 1

INVENTORS F. K. BOWERS
J. P. SCHAFER
BY
ATTORNEY

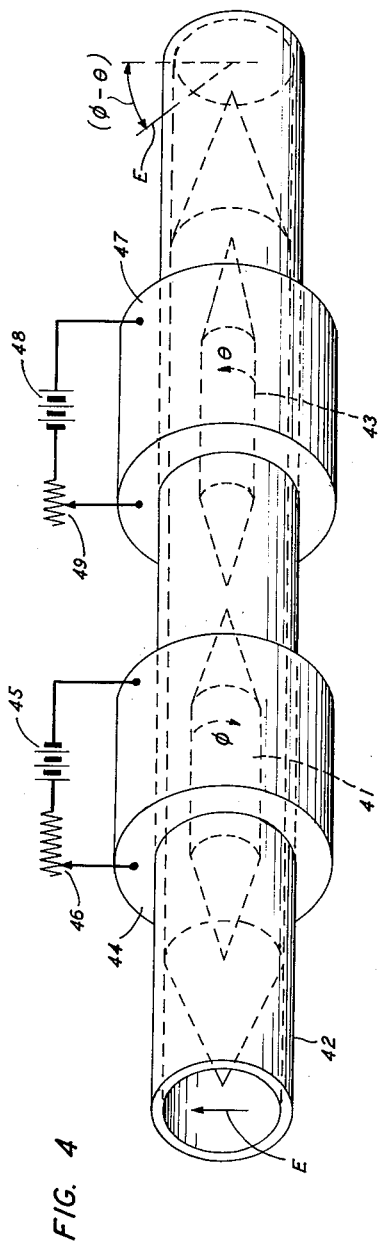
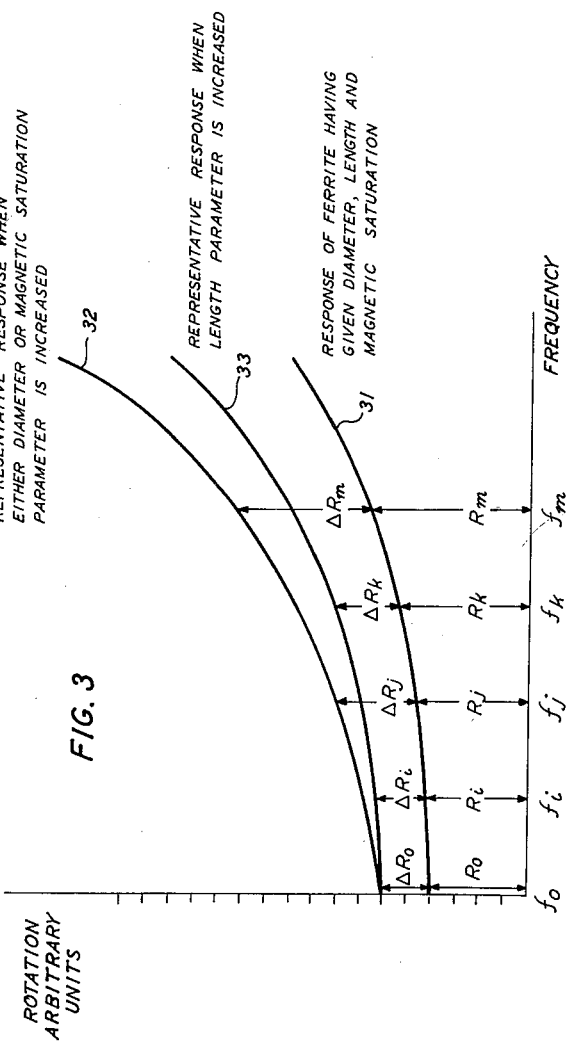

United States Patent Office 3,023,384
Patented Feb. 27, 1962

3,023,384
BROAD-BAND FERRITE POLARIZATION
ROTATOR
Fritz K. Bowers, Convent Station, and John P. Schafer, Elberon, N.J., assignors to Bell Telephone Laboratories, Incorporated, New York, N.Y., a corporation of New York
Filed Sept. 22, 1955, Ser. No. 535,986
14 Claims. (Cl. 333—98)

This invention relates to microwave transmission systems and more particularly to the use of a plurality of mutually compensating polarized ferrite elements in such systems to achieve a uniform effect upon transmitted electromagnetic waves over a broad frequency range.

Since the advent of the Faraday-effect polarization rotator employing an element of gyromagnetic material subject to an applied longitudinal field, many and varied applications and uses employing the Faraday rotator have arisen in the microwave art. For example, in a copending application by C. L. Hogan, Serial No. 252,432, filed October 22, 1951, which matured into U.S. Patent 2,748,353 on May 29, 1956, a Faraday-effect device is used as an operative component in an isolator, an amplitude modulator and a variable attenuator. In a copending application by A. G. Fox, Serial No. 520,222, filed July 6, 1955, a phase changer employing this device is disclosed. It is a characteristic of the Faraday element in a wave guide that it is frequency dependent, i.e., the angular rotation of the plane of polarization produced by a gyromagnetic element of a given composition and given dimensions subject to a given longitudinal magnetic field varies with the operating frequency. It has been ascertained that the higher the operating frequency the greater the magnitude of polarization rotation. In many of the Faraday rotator applications, for example, those mentioned above, this frequency dependency renders the operation of the microwave component inefficient if operated over a wide frequency band.

It is an object of the invention to compensate for the frequency dependency of gyromagnetic material in electromagnetic wave devices.

It is a more specific object to provide electromagnetic wave polarization rotation of a constant value in a transmission system operating over a wide frequency band.

The rotation versus frequency characteristic of a gyromagnetic element such as ferrite is a function of several parameters. Some of these parameters are the magnetic saturation of the ferrite which is in turn related to its density and therefore its chemical composition, the cross sectional dimensions of the element, and the element's electrical length as determined by the physical length of the ferrite or the strength of the applied field. It has been discovered that if two ferrite elements are properly biased magnetically and properly selected with respect to their rotation versus frequency characteristics, the rotation versus frequency curve obtained by transmitting wave energy through both the elements is much flatter than that which could be achieved by using any single element biased in the manner of the prior art.

More particularly, by selecting two ferrite elements according to the parameters mentioned above, which are specifically provided with similarly shaped rotation versus frequency curves but which curves differ from each other by a constant magnitude at each point along the frequency axis, and by then applying the longitudinal magnetic field to one ferrite of opposite polarity to that applied to the other, the amount of rotation produced in the transmission of waves through both the elements is equal to that constant difference in magnitude which is the algebraic sum of the rotations afforded by each. A wave traversing the first element is rotated by a given amount in, for example, the clockwise direction; on traversing the second element the wave is rotated by some different amount in the counterclockwise direction. Consequently, the total rotation produced is equal to the difference between the angular rotations produced by each of the two elements and in the sense of the angle produced by the element providing the greatest rotation. It may be seen, therefore, that the broad banding of Faraday rotation in the invention is independent of the individual non-linear rotation versus frequency curves associated with each element. As long as the curves are similarly shaped and one is inverted with respect to the other by applying respectively opposite polarities to the ferrites, their algebraic sum will be a constant value along the frequency axis.

These and other objects and features of the present invention, the nature of the invention and its advantages, will appear more fully upon consideration of the various specific illustrative embodiments shown in the accompanying drawings and in the following detailed description. In the drawings:

FIG. 3 is a graphical representation, given for the purpose of explanation, of the effect of changes in ferrite diameter, magnetic saturation, and electrical length upon the frequency response characteristic; and FIG. 4 is a perspective view of an alternative variation of the polarization rotator in FIG. 1, in accordance with the invention, utilizing variable applied magnetic fields.

Figure 1:
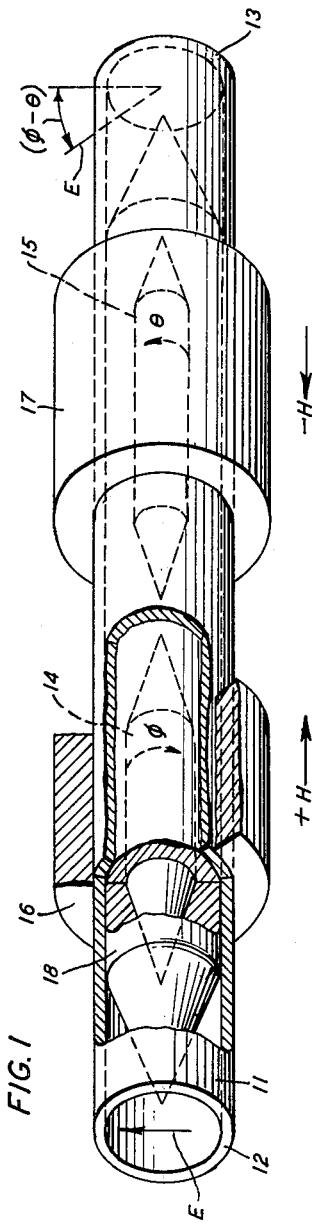
FIG. 1 is a perspective view of a broad band electromagnetic wave polarization rotator, in accordance with the invention.

In more detail, FIG. 1 is an embodiment of a polarization rotator in accordance with the invention, given by way of example for purposes of illustration, comprising a circular wave guide 11 of the metallic-shield type proportioned to support linearly polarized electromagnetic waves and preferably dimensioned so that only the various polarizations of the dominant $TE_{11}$ mode can be propagated. Interposed longitudinally and in series in guide 11 between its ends 12 and 13 are two elements of ferrite material 14 and 15 of the types and having the characteristics to be described. However, it should be noted that relative to element 15, element 14 is shorter in length, of smaller magnetic saturation, but wider in cross sectional diameter. Because of these differences, each element has a different transmission characteristic. Circumscribing guide 11 in the regions of ferrite elements 14 and 15, respectively, are two hollow cylindrical permanent magnets 16 and 17 which may be composed, for example, of material such as Alnico V. The permanent magnets 16 and 17 serve to provide a saturating longitudinal magnetic field to ferrite elements 14 and 15, respectively, i.e., a saturating field parallel to the longitudinal axis of circular guide 11. However, the cylindrical magnets are arranged such that the magnetic field applied to element 14 by magnet 16 is of opposite polarity to the magnetic field applied to element 15 by magnet 17. Ferrite elements 14 and 15 may be supported in guide 11 by any of the well-known techniques of the prior art. As specifically represented in FIG. 1, elements 14 and 15 are encased in dielectric material 18 which may be polyfoam, for example, or other low dielectric material, and which fills wave guide 11.

In a simplified version of the Faraday rotation phenomenon produced by ferrites, a plane polarized wave incident upon a polarized magnetic ferrite comprises two sets of component waves in the ferrite, each set of component waves being circularly polarized and in a sense opposite to the other set. The polarized ferrite exhibits respectively different permeabilities to each of the two sets of oppositely polarized component waves. As a consequence, one of the components has a smaller phase velocity than the other and the two component sets are propagated through the ferrite medium at unequal speeds. Upon emergence from the medium, the component waves combine to reform a resultant plane polarized wave, which is in general polarized at a different angle from the original wave due to the phase difference between the components introduced during propagation through the ferrite. It may be noted that Faraday rotation depends for its sense upon the direction of the magnetic field polarizing the ferrite in the same manner as the direction of translation of a screw is related to its direction of rotation. Thus, if the direction of the magnetic field is reversed, the sense of Faraday rotation is also reversed in space while retaining its original relationship to the direction of the field; the sense of rotation being independent of the direction of propagation along the axis of the ferrite element. This reversal of the sense of rotation is reasonable upon the basis of the theoretical model presented above, since with the reversal of polarity of the magnetic field, the permeabilities exhibited to the two components are interchanged. As a consequence, the component which previously had the smaller phase velocity now has the greater phase velocity.

In the operation of FIG. 1 a vertically polarized wave entering guide 11 at end 12 will experience a rotation of its polarization on traversing ferrite 14 by an angle $\Phi$ in the clockwise direction. On proceeding through ferrite 15, which is polarized oppositely to ferrite 14, the wave rotated by angle $\Phi$ in the clockwise direction will be rotated counterclockwise by an angle $\theta$ greater in magnitude than $\Phi$ such that on emerging from guide 11 at end 13 the polarization of the emergent wave will be of an angle from the vertical equal to $\Phi$ minus $\theta$ and in a counterclockwise direction. Thus, a vertically polarized wave entering guide 11 at end 12 will exit at end 13 polarized at an angle equal to the algebraic sum of the angular rotations afforded by each of elements 14 and 15.

Figure 2:
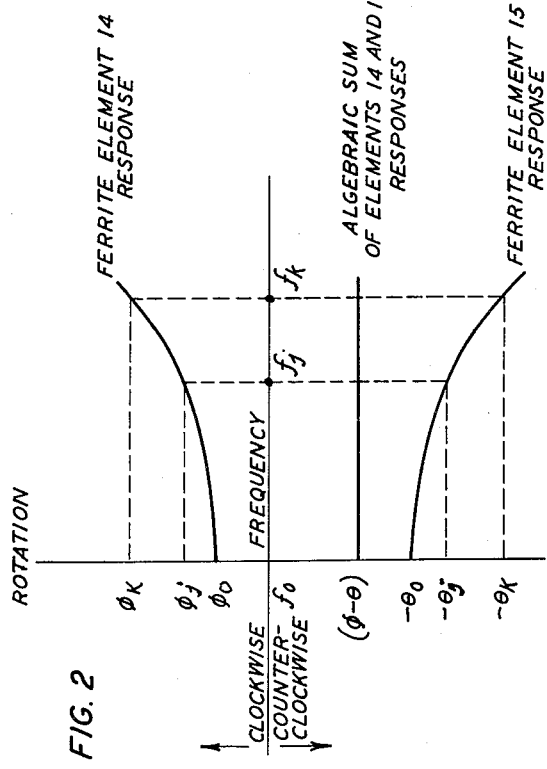
FIG. 2 is a graphical representation, given for the purpose of explanation, of the rotation versus frequency characteristic of the embodiment of FIG. 1.

FIG. 2 graphically and qualitatively represents for purposes of illustration, the rotation versus frequency characteristics of the ferrite elements of FIG. 1, and the frequency response of both ferrites employed in combination in the manner above described. It may be seen from FIG. 2 that although the frequency response of each ferrite is non-linear, the shapes and slopes of both curves are substantially the same. However, the frequency response curve due to element 15 is inverted with respect to that of element 14. This is the case because of the opposing polarities of the fields applied respectively to the elements. As a consequence, element 14 provides a clockwise rotation while element 15 provides a counterclockwise rotation. The effect on a wave propagated through both elements then is described by the algebraic sum of the respective response curves of the ferrites. This combined response is represented by the flat curve intersecting the rotation ordinate at ($\Phi-\theta$). It is because the curves respectively provided by the ferrites are similarly shaped that there is a constant difference between their responses across the frequency band and therefore the combined curve is flat. At every point along the frequency axis the algebraic sum of the corresponding points on the curves equals $\Phi-\theta$, i.e., $$(\Phi-\theta)=(\Phi_o-\theta_o)= \ldots =(\Phi_j-\theta_j)=(\Phi_k-\theta_k)= \ldots$$

This illustrates that the frequency response of the embodiment of FIG. 1 remains constant over a wide frequency range even though the individual frequency responses of elements 14 and 15 are not constant and are non-linear.

Several parameters are available to facilitate the matching of two ferrites so as to obtain any desired angle of net rotation ($\Phi-\theta$) constant with frequency. The more important of these parameters, as mentioned above, are exploited in elements 14 and 15 of FIG. 1. They are the diameters of the ferrite elements, the saturation magnetization of the ferrites, which is in turn dependent upon density and thus chemical composition, and the ferrite elements' physical lengths. Another parameter more directly related to the applied magnetic field rather than to the ferrites themselves will hereinafter be discussed relative to FIG. 4.

It is known that the angle of rotation for a given length of ferrite at a given frequency will increase radically and non-linearly with increase in the ferrite's diameter (this is not true, however, for very thin ferrite elements or in the case of very large diameter ferrites in wave guides such that the magnetic field is confined largely to the interior of the ferrite and excessive dielectric loss develops).

The diameter parameter has associated with it another interesting property which must be considered when matching ferrites for the purpose of obtaining a flat frequency response. Referring to FIG. 3, curve 31 represents the frequency response of a ferrite element having a given magnetic saturation, diameter and length. Curve 32 represents the frequency response of a ferrite element physically and chemically the same as that of curve 31 with the exception that the diameter of the element represented by curve 32 is greater than that represented by curve 31. As is expected, therefore, curve 32 is displaced upward along the rotation ordinate. However, the ratio of this upward displacement (at each frequency) to the original magnitude of rotation as represented by curve 31 varies across the frequency band; increasing with frequency. This ratio will hereafter be referred to as percentage change in rotation. Thus, at a frequency $f_m$, greater than a frequency $f_j$, not only is the magnitude of rotation greater at $f_m$ than at $f_j$ but the percentage change in rotation at $f_m$ is greater than at $f_j$. Therefore, not only is curve 32 non-linear but the percentage change of rotation for a given increase in diameter increases with frequency, i.e.:

$$\frac{\Delta R_o}{R_o} < \frac{\Delta R_j}{R_j} < \frac{\Delta R_m}{R_m} \qquad (1)$$

where $R_o$, $R_j$ and $R_m$ mean the rotation represented on curve 31 respectively at $f_o$, $f_j$ and $f_m$, and $\Delta R_o$, $\Delta R_j$ and $\Delta R_m$ are the increments in rotation at $f_o$, $f_j$ and $f_m$ with the diameter of the ferrite increased.

Another convenient means for establishing a desired rotation frequency characteristic is by control of the magnetic saturation of the ferrite element. It is known that increasing the magnitic saturation of a ferrite rod of given dimensions at a given frequency results in an increased rotation of the plane of polarization. Now, ferrites are materials comprising an iron oxide with a quantity of the oxide of nickel, magnesium, zinc, manganese, aluminum or other similar materials in which the other oxides combine with the iron oxide in a spinel structure. Therefore, a ferrite rod having a particular and desired magnetic saturation may be obtained by selecting a ferrite composed of a particular combination of the other oxides, and therefore of a particular density. Similarly, the proportions of these oxides to the iron oxide may likewise be used as a means for controlling the magnetic saturation of a ferrite and consequently, its rotation versus frequency characteristic. It is also known that the frequency response characteristic of a ferrite with an increased value of magnetic saturation is qualitatively substantially the same as in the case of an increase in diameter, but is quantitatively much less exaggerated. As a consequence, curve 32 is also applicable to the characteristic of magnetic saturation variation. However, while a small change in diameter replaces curve 31 with 32, a significant and major change in the magnetic saturation would be required to produce a quantitatively equivalent result.

Variation in ferrite length results in a change in frequency response somewhat different from that of the parameters discussed above. It may be shown that the frequency response curve attributable to a ferrite having an increased length provides an increased amount of rotation over the whole range of frequencies proportional to the increase in length but that the percentage change in rotation remains constant throughout. This is the case since there is an increase in the electrical path length traversed by the two oppositely polarized circular components traveling at unequal speeds. Consequently, the phase difference between the wave components upon emerging from the ferrite is increased proportionately at every frequency with the increased length of the anisotropic medium. Curve 33 of FIG. 3 represents the frequency response of a ferrite element which differs from the ferrite of curve 31 only in that it is longer. It may be seen from curve 33 that the percentage change in rotation is constant, i.e.:

$$\frac{\Delta R_o}{R_o} = \frac{\Delta R_i}{R_i} = \frac{\Delta R_k}{R_k} \quad (2)$$

Comparison of Equation 2 with Equation 1 and the respective curves 33 and 32 indicates that a change in ferrite length results in a less radical change in the shape of the rotation versus frequency characteristic than is the case with changes in magnetic saturation and/or ferrite diameter. However, it may be noted that large increases in ferrite length will also produce rather radical changes in the frequency characteristic. This is so because the total rotation is greatly increased. Therefore, even though the percentage change remains constant across the frequency abscissa the effect is compounded radically as frequency increases due to the large values of total rotation, R.

A detailed exposition dealing with these parameters and the parameter hereinafter to be discussed with respect to FIG. 4 is presented in a comprehensive paper by A. G. Fox, S. E. Miller and M. T. Weiss, "Behavior and Applications of Ferrites in the Microwave Region," Bell System Technical Journal, January 1955.

From the above discussion, it may be seen that a multitudinous combinatorial and permutational population of the above-mentioned parameters is available for selection to fit the specific requirements of any particular application of the invention. It is the case that there is only one restriction upon the manner in which the parameters may be combined. This restriction is that neither of the two elements may be at the same time the longer and the wider and have the greater magnetic saturation. Clearly, in this restricted situation, the curve of that single element would be so steep that matching its shape and slope would not be possible. However, any other combination is feasible.

The frequency response matching of ferrites may readily be accomplished on an empirical basis. However, with the theoretical discussion presented above ferrites having well known response characteristics may be matched a priori by algebraically adding curves of the type discussed in FIG. 2. With a given amount of net rotation desired the process is essentially one of curve fitting.

In one of the several operative and successful embodiments of the invention that were reduced to practice, a 45 degree net rotation was produced for an isolator application which was constant to ±1 degree over approximately a 15 percent frequency band at microwave frequencies (a 1.6 kilomegacycles band ranging from 10.4 kilomegacycles to 12 kilomegacycles). There was practically no change in rotation over the band from 10.8 to 11.8 kilomegacycles. This contrasts with approximately ±5 degrees which is the best that can be obtained with a single ferrite element over a 10 percent band without the compensation in accordance with the invention. In this reduction to practice one ferrite element was .135 inch in diameter, 5¾ inches in length, and of the following chemical composition:

$$Ni_{0.9}Zn_{0.1}Mn_{0.02}Fe_{1.9}O_4$$

The other ferrite element was .171 inch in diameter, 3.0 inches in length, and of the following chemical composition:

$$Mn_{0.1}Mg_{1.0}Al_{0.2}Fe_{1.7}O_4$$

In another reduction to practice providing a 45 degree net rotation and similarly flat response, the chemical compositions of the two ferrite elements were precisely the same. The variables utilized were that of length and diameter. Specifically, the chemical composition of both ferrites was $Ni_{0.35}Zn_{0.65}Fe_{1.9}O_4$; the diameter of one ferrite being .140 inch, length 4⅜ inches, while the diameter of the second element was .165 inch with a length of 1⅝ inches. However, it seems clear that with the restriction on the number of parameters available for matching purposes, as in this reduction to practice, the matching process becomes more difficult.

Referring now to FIG. 4, a variation in accordance with the invention of the polarization rotator of FIG. 1 is represented by way of example for illustrative purposes. In this embodiment two ferrite elements being dissimilar as to diameter but having the same lengths and magnetic saturations are employed. Two longitudinal magnetic fields of variable strength and of opposing polarities are applied respectively to the two elements.

In the discussion of FIG. 1, it was pointed out that with all other factors held constant the total rotation produced in a ferrite due to its total electrical path length could be increased or decreased by increasing or decreasing the physical length of the ferrite element. However, with a given length of ferrite a variation in the magnitude of rotation may be accomplished by varying the strength of the magnetic field applied to a ferrite. This effectively varies the electrical path length of the ferrite. As a consequence, the angle of rotation produced is roughly proportional to the strength of the field applied to the ferrite up to the region of saturation. Therefore, this process is quite similar to that of changing the physical length of ferrite and as a consequence, changes in the shape and slope of the frequency response curve attributable to changes in field strength are similar to that which would be achieved by changing the physical length of the ferrite. As a consequence, the description in reference to FIG. 4 is also applicable to the parameter of applied magnetic field strength.

In FIG. 4, the respective strengths of the fields applied to the two elements in conjunction with the difference in the parameter of ferrite diameter are responsible for producing two frequency response curves of similar shape and slope over a wide frequency range. In FIG. 4 a ferrite rod 41 is longitudinally disposed along the longitudinal axis of a round metallic wave guide section 42. In series with rod 41 is another ferrite rod 43 but of smaller diameter than that of element 41. Circumscribing guide 42, and encompassing the length of ferrite element 41 is a means for producing a variable strength longitudinal magnetic field which may be a solenoid 44 supplied by a direct current source 45 by way of potentiometer 46. Circumscribing guide 42 in another region and encompassing ferrite 43 is a similar solenoid 47 supplied by a current source 48 by way of potentiometer 49. The positive terminal of source 45 is connected to the left-hand side of solenoid 44 while the positive terminal of source 48 is connected to the right-hand side of solenoid 47; solenoid 44 thereby polarizing ferrite 41 oppositely to the polarity of ferrite 43 provided by solenoid 47.

In the operation of FIG. 4 potentiometers 46 and 49 are placed at different settings so that the fields applied by solenoids 44 and 47 are of different strengths. To the difference in diameter of the two ferrites is attributable the effect that must be compensated by the variable strength applied fields. Accordingly, the strength of the field applied to element 43 is greater than that applied to element 41. With the given relative diameters the field strengths of the solenoids compensate the frequency response curves of the ferrites 41 and 43 such that they are similarly shaped and of the same slope as was the case in FIG. 1 as depicted in the curves of FIG. 2. A plane polarized wave traversing ferrite 41 is rotated clockwise by an angle $\phi$; then on traversing ferrite 43 the wave is rotated counterclockwise by an angle $\theta$ which is greater than $\phi$ since ferrite 43 produces a larger magnitude rotation due to its particular combination of parameters. The net rotation produced thereby is an angle equal to $\phi$ minus $\theta$ in the counterclockwise sense. A net rotation in the opposite sense, i.e., clockwise may be provided merely by reversing the terminals on both sources 45 and 48.

The use of variable strength magnetic fields may equally be applied to the case of the embodiment of FIG. 1. The use of variable fields provides an important advantage thus far not discussed. It is well known that the magnetic saturation of a ferrite decreases with increasing temperature. As a consequence, variations in temperature will produce a variation in the frequency response curve of a type similar to that depicted by curve 32 of FIG. 3 but of smaller magnitude. However, this variation may be compensated for by appropriately changing the strength of the magnetic fields applied to the ferrites. This compensating effect will, of course, only be compensating in the manner depicted by the frequency response curve 33, due to the increased length parameter. Clearly, this compensation is of a somewhat different type than the variation it must correct in that it is more flat. Therefore, a perfect compensation may not be possible by this mechanism within the area of limited changes in applied field strength. However, as can be seen from the theoretical discussion presented above with respect to FIG. 3 some compensation is possible and if the range of temperature variation is not too large, the compensation by this means may be very effective.

In all cases, it is understood that the above-described arrangements are simply illustrative of a small number of many possible specific embodiments which can represent applications of the principles of the invention. Numerous and varied other arrangements can readily be devised in accordance with said principles by those skilled in the art without departing from the spirit and scope of the invention.

What is claimed is:

1. In an electromagnetic wave transmission system for propagating plane polarized waves, a broad band polarization rotator comprising a first element of ferrite material magnetically biased in a given longitudinal sense and having a given frequency dependent rotation response to said waves over a broad band of frequencies, a second element of ferrite material magnetically biased in a sense opposite to said given sense, said second element differing from said first element in at least one of the parameters of electrical length, physical length, cross sectional dimension and magnetic saturation and having a similarly shaped frequency dependent response curve which varies with frequency at equal rates and in the same relative sense but inverted with respect to said given response curve because of said opposite bias, the strengths of said magnetic biases being outside the region of gyromagnetic resonance for a frequency within the operating region of said transmission system, whereby the plane of polarization of said plane waves propagated through both said elements experiences a total rotation that is constant over said broad band of frequencies and equal to the algebraic sum of the rotations produced by said first and second elements.

2. A broad band electromagnetic wave polarization rotator comprising a circular wave guide for supporting plane polarized electromagnetic waves, a first means including an elongated ferrite element magnetically biased in a given longitudinal sense and having a given frequency dependent rotation in response to said waves over a broad band of frequencies for rotating the polarization of said waves by a given angle in a given sense, a second means simultaneously operative with said first means and including an elongated ferrite element magnetically biased in a sense opposite to the biasing sense applied to said first-mentioned element, said second-mentioned element differing from said first-mentioned element in at least two of the parameters of electrical path length, physical length, cross sectional dimensions and magnetic saturation and having a similarly shaped frequency dependent rotation response but inverted with respect to said given response, said second-mentioned element having at least one of the parameters of electrical length, physical length, cross sectional dimensions and magnetic saturation greater than the corresponding parameter of said first-mentioned element and having another of said parameters less than the corresponding parameter of said first-mentioned element for rotating the polarization of said waves by an angle different from said given angle and in a sense opposite to said given sense, said first and second ferrite elements disposed longitudinally in said guide and in the path of said waves.

3. A combination as defined in claim 2 wherein the electrical path length of said first mentioned ferrite element is different from that of said second mentioned ferrite element.

4. A combination as recited in claim 2 wherein the magnetic biasing fields are of equal strength.

5. A combination as recited in claim 2 wherein the magnetic biasing fields are of different strengths.

6. A combination as recited in claim 2 wherein the chemical composition of said first mentioned ferrite element is different from that of said second mentioned ferrite element, whereby the density and magnetic saturation of said elements are respectively different.

7. A combination as recited in claim 2 wherein the cross sectional dimensions of said first mentioned ferrite element are different from those of said second mentioned ferrite element.

8. A combination as defined in claim 7 wherein the physical length of said first mentioned ferrite element is different from that of said second mentioned ferrite element.

9. A combination as defined in claim 7 wherein the physical length of said first mentioned ferrite element is the same as that of said second mentioned ferrite element.

10. A combination as recited in claim 2 wherein the biasing fields are provided by solenoids supplied by variable current sources, whereby the strengths of the magnetic biasing fields applied respectively to said first mentioned and second mentioned elements are variable.

11. A broad band microwave polarization rotating apparatus comprising means for directing plane polarized microwave energy along an axis, a first ferrite polarization rotator disposed along said axis comprised of a first ferrite member and a first magnetic field directed along said axis, said first ferrite rotator rotating the plane of polarization of the energy through a first angle at the lower limit of a predetermined frequency range and through an angle equal to said first angle plus a second angle at the higher limit of the predetermined frequency range, a second ferrite polarization rotator disposed along said axis in spaced relation to said first ferrite rotator comprised of a second ferrite member and a second magnetic field directed along said axis, said second ferrite rotator rotating the plane of polarization of the energy through a third angle different in magnitude from said first angle at the lower limit of said predetermined range and through an angle equal to said third angle plus said second angle at the higher limit of the predetermined frequency range, said first and second rotators producing substantially identical rates of change of angle of rotation with frequency throughout said predetermined frequency range, said first and second ferrite rotators rotating the plane of polarization of microwave energy in opposite directions, whereby the net rotation over said predetermined frequency range is substantially constant.

12. In an electromagnetic wave transmission system for propagating plane polarized waves over a broad band of frequencies, a broad band polarization rotator comprising a first element of magnetically polarizable material capable of introducing a given frequency dependent Faraday effect rotation to said waves over said broad band when magnetically polarized in a given longitudinal sense, a second element of magnetically polarizable material also capable of introducing a Faraday effect rotation to said wave energy, said second element being magnetically polarized in a longitudinal sense opposite to said given sense to produce a frequency dependent rotation response that is inverted with respect to the rotation response of said first element, said second element differing from said first element in at least one of the parameters of electrical length, physical length, cross sectional dimensions and magnetic saturation so that the algebraic sum of the rotations produced by said first and said second elements is substantially constant over said broad band of frequencies.

13. In an electromagnetic transmission system for propagating plane polarized waves over a broad band of frequencies, a broad band polarization rotator comprising a first element of magnetically polarizable material capable of introducing a frequency dependent Faraday effect rotation to said waves over said broad band of frequencies, a second element of magnetically polarizable material also capable of introducing a Faraday effect rotation to said wave energy, said elements being magnetically biased in opposite senses so that the total rotation produced by said elements is the difference between the rotation produced by each of said elements, said second element differing from said first element in one of the parameters of electrical length and physical length and also differing in one of the parameters of cross sectional dimensions and magnetic saturation to produce a polarization rotation that is greater in amplitude over said band than the rotation of said first element and having a rotation versus frequency characteristic that bears a substantially constant difference over said band to the rotation versus frequency characteristic of said first element.

14. A broad band microwave polarization rotating apparatus comprising means for directing plane polarized microwave energy along an axis, a first ferrite polarization rotator disposed along said axis comprised of a first ferrite member and a first magnetic field directed along said axis, said first ferrite rotator rotating the plane of polarization of the energy through a first angle at the lower limit of a predetermined frequency range and through an angle equal to said first angle plus a second angle at the higher limit of the predetermined frequency range, a second ferrite polarization rotator disposed along said axis in successive relation to said first ferrite rotator comprised of a second ferrite member and a second magnetic field directed along said axis, said second ferrite rotator rotating the plane of polarization of the energy through a third angle different in magnitude from said first angle at the lower limit of said predetermined range and through an angle substantially equal to said third angle plus said second angle at the higher limit of the predetermined frequency range, said first and second rotators producing substantially identical rates of change of angle of rotation with frequency throughout said predetermined frequency range, said first and second ferrite rotators rotating the plane of polarization of microwave energy in opposite directions, whereby the net rotation over said predetermined frequency range is substantially constant.

References Cited in the file of this patent

UNITED STATES PATENTS

| | | |
|---|---|---|
| 2,644,930 | Luhrs | July 7, 1953 |
| 2,719,274 | Luhrs | Sept. 27, 1955 |
| 2,741,744 | Driscoll | Apr. 10, 1956 |
| 2,748,353 | Hogan | May 29, 1956 |
| 2,773,245 | Goldstein | Dec. 4, 1956 |
| 2,802,184 | Fox | Aug. 6, 1957 |
| 2,806,972 | Sensiper | Sept. 17, 1957 |
| 2,830,289 | Zaleski | Apr. 8, 1958 |

FOREIGN PATENTS

| | | |
|---|---|---|
| 1,089,421 | France | Sept. 29, 1954 |

OTHER REFERENCES

Darrow: Bell System Technical Journal, vol. 32, Nos. 1 and 2, January and March 1953, pages 74–99 and 384–405.

Spectroscopy at Radio and Microwave Frequencies (D. J. E. Ingram), published by Butterworths Scientific Publications (London), 1955. (Pages 205 and 215 relied on.)